(12) United States Patent
Fell

(10) Patent No.: US 11,062,419 B1
(45) Date of Patent: Jul. 13, 2021

(54) IMAGE PROCESSING SYSTEM

(71) Applicant: Arm Limited, Cambridge (GB)

(72) Inventor: Robin Paul Fell, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/929,511

(22) Filed: Jul. 15, 2020

(51) Int. Cl.
  *G06T 1/00* (2006.01)
  *H04N 1/32* (2006.01)

(52) U.S. Cl.
  CPC ....... *G06T 1/0021* (2013.01); *H04N 1/32267* (2013.01); *H04N 1/32352* (2013.01)

(58) Field of Classification Search
  CPC .............. G06T 1/0021; H04N 1/32267; H04N 1/32352
  See application file for complete search history.

*Primary Examiner* — Christopher Wait
(74) *Attorney, Agent, or Firm* — Vierra Magen Marcus LLP

(57) ABSTRACT

An image processing system comprises one or more image sensors configured to take images, one or more image processors configured to process images taken by the one or more image sensors to produce output images, and one or more circuits configured to use output images. The one or more image processors comprise a set of one or more image processing stages, and each stage is configured to process images using a respective image processing operation. Processing circuitry is configured to verify image processing performed by one or more image processing stages, by inserting one or more probes into one or more images prior to the one or more images being processed by the one or more image processing stages, and attempting to identify the one or more probes in an output of the one or more processing stages.

22 Claims, 5 Drawing Sheets

IMAGE PROCESSING SYSTEM

BACKGROUND

The technology described herein relates to an image processing system and in particular to an image processing system in which images are modified using a processor before being used (e.g. displayed).

Automotive Mirror Replacement systems have been designed to replace or supplement the (e.g. exterior) mirrors of a vehicle with a camera-based system. Images taken by a camera are modified by an image processor so as to be displayed in an appropriate form to the vehicle operator. However, processing errors within such systems can significantly affect the safety of the vehicle.

The Applicant believes that there remains scope for improvements to image processing systems.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
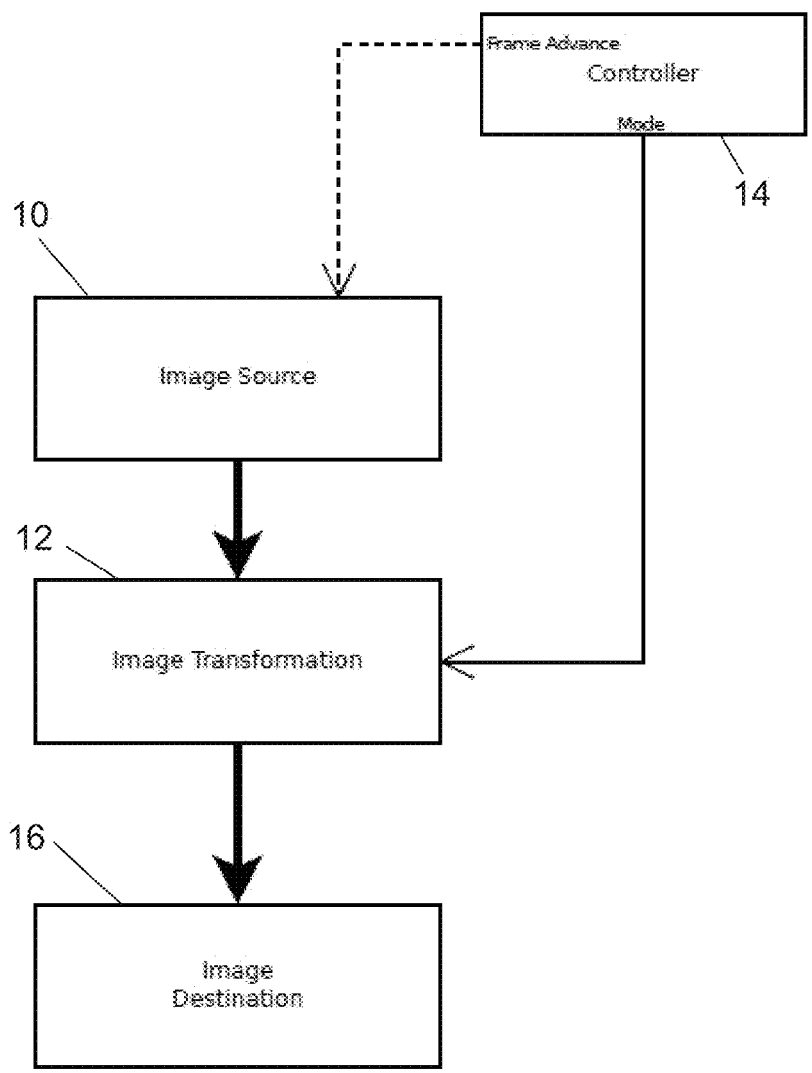
FIG. 1 shows schematically a conventional image processing system.

A first embodiment of the technology described herein comprises an image processing system, comprising:

one or more image sensors configured to take images;

one or more image processors configured to process images taken by the one or more image sensors so as to produce output images, wherein the one or more image processors comprise a set of one or more image processing stages, each stage being configured to process images using a respective image processing operation;

one or more circuits configured to use output images produced by the one or more image processors; and processing circuitry configured to verify image processing performed by one or more image processing stages of the set of one or more image processing stages, by:

inserting one or more probes into one or more images prior to the one or more images being processed by the one or more image processing stages of the set of one or more image processing stages; and attempting to identify one or more probes in an output of the one or more processing stages.

A second embodiment of the technology described herein comprises a method of operating an image processing system, the method comprising:

taking one or more images;

processing the one or more images using a set of one or more image processing stages so as to produce one or more output images; and using the one or more output images;

the method further comprising:

verifying image processing performed by one or more image processing stages of the set of one or more image processing stages, by:

inserting one or more probes into one or more images prior to the one or more images being processed by the one or more processing stages of the set of one or more image processing stages; and attempting to identify one or more probes in an output of the one or more processing stages.

Various embodiments are directed to an image processing system which comprises one or more image sensors configured to take images of an environment, one or more image processors configured to process the images taken by the one or more image sensors using a set of one or more image processing stages so as to produce output images, and one or more circuits configured to use the output images produced by the one or more image processors.

The image processing system further comprises processing circuitry configured to verify the image processing operations performed by one or more image processing stages of the set of stage(s), i.e. to check whether (or not) the one or more image processing stages are (sufficiently) accurately performing their respective image processing operation(s). This is done by inserting one or more probes (which may each have a unique, known configuration) into one or more images prior to the one or more images being processed by the one or more processing stages (e.g. such that the one or more probes are subjected to the same image processing operations as the one or more images), and then attempting to identify some or all of the one or more probes in an output of (e.g. output images produced by) the one or more processing stages.

Where one or more expected probes cannot be identified in the output (or where one or more expected probes is identified in an unexpected temporal and/or spatial position within the output, or where one or more unexpected probes (e.g. a probe that was expected to have been removed from the output) is identified in the output), then it may be determined that the one or more image processing stages have not (sufficiently) accurately performed their image processing operation(s). Where, on the other hand, each of one or more expected probes can be identified in the output (e.g. at respective expected temporal and/or spatial position(s)) (and where no unexpected probes are identified in the output), then it may be determined that the one or more image processing stages have (sufficiently) accurately performed their image processing operation(s).

Thus, attempting to identify one or more probes in the output of the one or more processing stages allows the image processing system to determine the fidelity with which the one or more image processing stages have performed their image processing operation(s).

As the one or more processing stages are part of a set of processing stages which set is configured to produce output images from the images taken by the image sensor(s), this in turn allows the image processing system to determine whether (or not) the output images are a sufficiently accurate representation of the environment. Where the output images are determined not to be a sufficiently accurate representation of the environment, the image processing system may indicate this, e.g. to an operator and/or to the circuit(s) that is configured to use the output images, so as to prevent the images being used in an inappropriate (e.g. unsafe) manner.

Embodiments accordingly provide a relatively straightforward and robust technique for verifying image processing operations performed by one or more image processors. It will be appreciated, therefore, that various embodiments provide an improved image processing system.

Various embodiments also extend to the image processor itself.

Thus, a further embodiment of technology described herein comprises an image processor comprising:

image processing circuitry configured to process images so as to produce output images, wherein the image processing circuitry comprise a set of one or more image processing stages, each stage being configured to process images using a respective image processing operation; and processing circuitry configured to verify image processing performed by one or more image processing stages of the set of one or more image processing stages, by:

inserting one or more probes into one or more images prior to the one or more images being processed by the one or more processing stages of the set of one or more image processing stages; and attempting to identify one or more probes in an output of the one or more processing stages.

A further embodiment of technology described herein comprises a method of operating an image processor, the method comprising:

processing images using a set of one or more image processing stages so as to produce output images; and verifying image processing performed by one or more image processing stages of the set of one or more image processing stages, by:

inserting one or more probes into one or more images prior to the one or more images being processed by the one or more processing stages of the set of one or more image processing stages; and attempting to identify one or more probes in an output of the one or more processing stages.

The image processing system of various embodiments comprises one or more image sensors configured to take images, one or more image processors configured to process images taken by the one or more image sensors so as to produce output images, and one or more circuits configured to use output images produced by the one or more image processors.

The images that are taken by the one or more image sensors may comprise any suitable such image(s), e.g. of an environment.

The images may comprise images that are for use (that are to be used) (after being processed) by an (human) operator when controlling an apparatus (e.g. vehicle) within an environment. It would also be possible for the images to comprise images that are for use (that are to be used) (after being processed) by some other consumer circuit, such as a machine learning system (in addition to or instead of being used by a (human) operator).

The images may be images of an environment surrounding an apparatus that can move within the environment, e.g. under control of an (human) operator (or otherwise). The images may be images of a "natural" environment.

In various particular embodiments, the images are images of an environment surrounding a vehicle (e.g. a motor vehicle or otherwise) (where the vehicle may be controlled by an operator (e.g. driver)). For example, the images may comprise images of the environment behind the vehicle (e.g. which images may be for use by the operator (driver) in the manner of a rear-view mirror or side mirror). The images may also or instead comprise images of the environment on another side of the vehicle, such as in front of or to the side of the vehicle, etc. (e.g. which images may be for use by the operator (driver) when controlling the vehicle).

In various other embodiments, the images are images of an environment surrounding a medical device such as an endoscope (where the endoscope may be controlled by an operator). For example, the images may comprise images of a medical environment e.g. inside a patient's body (e.g. which images may be for use by the operator of the medical device when controlling the medical device).

Other arrangements would be possible.

Each image should (and in various embodiments does) comprise an array of plural data positions (pixels), with each data position (pixel) taking a particular data (e.g. colour) value. Thus, each image may comprise plural lines of data positions (pixels) and plural columns of data positions (pixels).

The data values for the data positions of the data array can be any suitable and desired data values. The data array element data values may be pixel and/or sampling position data (data values).

In embodiments, the data values represent colour values such as RGB or YUV colour values. In various particular embodiments, each data position (pixel) takes a particular data (e.g. colour) value for each of plural (colour) channels. Thus, for example, the data value for each data position (pixel) may comprise a data (e.g. colour) value for each of three (e.g. RGB or YUV) colour channels. Each data (e.g. colour) value may comprise, for example, 8 bits.

Each image sensor of the one or more image sensors may comprise any suitable image sensor, such as each being an image sensor of a camera.

Each image sensor may be configured to take a (temporal) sequence of images (frames) of the environment, i.e. to take a video of the environment. Thus, each image may be one such image (frame) from a sequence of images (frames), e.g. taken by an image sensor.

Each of the one or more image sensors (one or more cameras) may be mounted on the apparatus (e.g. vehicle) that is configured to move within the environment. Thus, in various embodiments, each image sensor is an image sensor of an apparatus such as a vehicle, that can move within an environment, e.g. under control of an (human) operator (or otherwise). Each of the image sensors may be mounted in any suitable location on the apparatus (e.g. vehicle), i.e. such that the images taken by the sensor can be used (e.g. by the operator) when controlling the apparatus (e.g. vehicle). For example, the one or more images sensors may each be mounted on the exterior of the apparatus (e.g. vehicle or endoscope, etc.).

The image processing system may comprise any suitable number of image sensors, such as one, two, three or more images sensors. Each image sensor may be configured to take its own respective (set of) image(s), which images may each be processed by the one or more processors and used (e.g. displayed).

In one particular embodiment, the apparatus comprises a vehicle, and the image processing system comprises two (or more) image sensors (cameras), e.g. configured and arranged to take images of the environment behind the vehicle, e.g. in the manner of rear view or side mirrors of the vehicle.

Other arrangements would be possible.

The image processing system may be configured such that images taken by each image sensor are provided to the one or more images processors, e.g. by writing each image to a memory (from where it can be read by the one or more image processors). The memory may comprise any suitable memory and may be configured in any suitable and desired manner. For example, it may be a memory that is integrated with (on chip with) the image sensor in question, or it may be an external memory. In particular embodiments it is in external memory, such as a main memory of the overall image processing system. It may be dedicated memory for this purpose, or it may be part of a memory that is used for other data as well.

In the technology described herein, images taken by the one or more image sensors are processed by one or more image processors so as to produce output images. The output images may be output images for display (which are provided to one or more displays), and/or may be output images that are to be used by some other consumer circuit such as a machine learning system.

Each image processor may comprise any suitable such image processor. Each image processor may be provided as a (single) integrated circuit ("chip") (or otherwise).

Each image processor may be configured to read images to be processed from a memory in which the images are stored. (This memory may comprise any suitable memory, but in particular embodiments is an external memory, such as the main memory of the overall image processing system.)

The one or more image processors may comprise a single image processor (e.g. in the form of a single integrated circuit or "chip"), or may comprise multiple image processors (e.g. multiple integrated circuits or "chips").

Where the one or more image processors comprise multiple image processors, the image processing system may be configured so that the images taken by the one or more image sensors can be processed by each of the image processors in turn, so as to produce the output images.

In these embodiments, one or more or each image processor may be configured to provide (intermediate) processed image(s) to another image processor, e.g. by writing each (intermediate) processed image to a memory (from where it can be read by the other image processor). This memory may comprise any suitable memory, but in particular embodiments is an external memory, such as the main memory of the overall image processing system.)

The image processor that produces the (final) output images may also be configured to provide each output image to the consumer circuit that is configured to use the images (e.g. the display), e.g. by writing each the output images to a memory (from where it can be read by the consumer circuit such as the display's display controller). This memory may comprise any suitable memory, but in particular embodiments is an external memory, such as the main memory of the overall image processing system.

The one or more image processors are configured to process images using a set of one or more image processing stages, where each stage is configured to process images using a respective image processing operation. In other words, the one or more image processors may be configured to process images using a set of one or more image processing operations.

Where the image processing system comprises a single image processor, the single image processor will comprise all of the image processing stages of the set. Alternatively, where the image processing system comprises plural image processors, each image processor may comprise one or more of the image processing stages of the set.

The images may be processed by the one or more image processors in any suitable manner, e.g. by subjecting each image of the images to one or more image processing operations, e.g. in turn.

In various embodiments, one or more or each (and every) image of the images taken by the one or more image sensors is processed independently. In various embodiments, this is done such that each of the output images corresponds to one (and only one) of the (original) images taken by the one or more image sensors. However, it would also be possible for the processing to be configured such that one or more or each of the output images corresponds to two or more of the (original) images taken by the one or more image sensors, e.g. where two or more images are combined or composited to generate an output image.

In various embodiments, one or more or each (and every) image of the images taken by an image sensor is processed by the same set of image processing stage(s) (by the same image processing operations(s)). In these embodiments, each stage of the set may be configured in the same way for each (and every) image, or different images may be processed using the same set of image processing stage(s) but where one or more of the stages of the set is configured differently.

It would also be possible for different images to be processed by different (sets of) image processing stages (image processing operations). For example, a mode of operation may be changed, or the images taken by a first image sensor may be processed using a first set of image processing stages, and the images taken by a second image sensor may be processed using a second different set of image processing stages. Each of the image processing stages in the first set may be different to each of the image processing stages in the second set, or the first and second set may share at least some image processing stages.

Each image processing stage should be (and in various embodiments is) configured to modify (the image data of) each image processed by that stage (and each image processing operation should have the effect of modifying each image processed using that operation). Thus, each of the output images should be (and in various embodiments is) a modified version of (is different to) the corresponding (original) image(s) taken by the one or more image sensors.

The set of image processing stages may comprise any suitable set of one or more image processing stages (and the set of image processing operations may comprise any suitable set of one or more image processing operations).

In various particular embodiments, the set is configured such that each of the images is processed so as to produce a version of that image that is suitable for displaying (on a display) to the operator (e.g. driver) of the apparatus (e.g. vehicle), such that the operator can use the image when controlling the apparatus (e.g. vehicle). However, this need not be the case, e.g. where the images are to be used by another consumer circuit (without being displayed).

The set of one or more image processing stages (operations) may comprise a single image processing stage (operation). However, in various particular embodiments, the set of one or more image processing stages (operations) comprises a set of plural (different) image processing stages (operations). In this latter case, the set of image processing stages (operations) may be arranged in a pipeline configuration, i.e. so that each image is sequentially processed by each stage (operation) of the set so as to produce an output image.

Each image processing stage of the set may comprise any suitable such stage, and may be configured to process images using any suitable image processing operation.

In various particular embodiments, one or more or each of the image(s) are scaled (e.g. upscaled and/or downscaled), i.e. so as to generate one or more scaled images. One or more or each of the image(s) may also or instead be cropped, i.e. so as to generate one or more cropped images.

In this regard, the Applicant has recognised that where the apparatus is a vehicle (as describe above) (or otherwise), it may be necessary or desirable for the one or more images sensors to be configured to take images at a higher resolution and/or larger size than would be possible or convenient to display, e.g. on the panel(s) within the vehicle.

For example, images may need to be taken at a relatively high resolution and/or with a relatively large size in order to allow techniques such as automatic image recognition, dewarping of a distorted image (e.g. which may have been produced using a fisheye lens or similar to provide a wide field of view), and the like, to be performed on the image, whereas the images may need to be displayed at a lower resolution and/or reduced size in accordance with a maximum resolution and/or size of the panel(s). As such, it may be necessary or desirable to downscale and/or crop one or more or each of the image(s) taken by the one or more image sensors.

Thus, in various embodiments, the set of one or more image processing stages comprises a scaler (scaling circuitry) configured to scale (e.g. upscale and/or downscale) an image to generate a scaled image. Equally, the set of one or more image processing operations may comprise scaling, and one or more or each of the output images may comprise a scaled image.

In various embodiments, the set of one or more image processing stages also or instead comprises a cropping stage (cropping circuitry) configured to crop an image to generate a cropped image. Equally, the set of one or more image processing operations may comprise cropping, and one or more or each of the output images may comprise a cropped image.

One or more or each of the image(s) may also or instead be flipped, i.e. so as to generate one or more flipped (mirror-image) images. In this regard, the Applicant has recognised that where the apparatus is a vehicle (as describe above) (or otherwise), it may be necessary or desirable for a mirror image of the one or more images taken by the sensors to be displayed, e.g. on the panel(s) within the vehicle, e.g. where the image(s) are being displayed for use by an operator (driver) of the vehicle in the manner of a rear view or side mirror(s).

Thus, in various embodiments, the set of one or more image processing stages also or instead comprises a flip stage (flip circuitry) configured to flip an image to generate a flipped image. Equally, the set of one or more image processing operations may comprise flipping, and one or more or each of the output images may comprise a flipped image. In these embodiments, an image may be flipped horizontally and/or vertically.

One or more or each of the image(s) may also or instead be subjected to image enhancement processing, i.e. so as to generate one or more enhanced images. Such processing may be necessary or desirable, e.g. where the apparatus is a vehicle (as describe above) (or otherwise), so as to improve intelligibility of the displayed images to the operator (driver) of the apparatus (e.g. vehicle) (or otherwise).

Thus, in various embodiments, the set of one or more image processing stages also or instead comprises one or more image enhancement stages (image enhancement circuitry) configured to enhance an image to generate an enhanced image. Equally, the set of one or more image processing operations may comprise image enhancement, and one or more or each of the output images may comprise an enhanced image. In these embodiments, one or more or each image may be enhanced in any suitable manner, e.g. by modifying (enhancing) the brightness, colour, contrast, etc. of the image.

Other image processing operation(s) would be possible. For example, one or more or each of the image(s) may also or instead be composited, i.e. so as to generate one or more composited images.

Thus, in various embodiments, the set of one or more image processing stages also or instead comprises a compositor (composition circuitry) configured to compose two or more image to generate a composited image. Equally, the set of one or more image processing operations may comprise composition, and one or more or each of the output images may comprise a composited image. In these embodiments, two or more images taken by one or more of the one or more image sensors may be composited, and/or one or more images taken by one or more image sensors may be composited with one or more other images. For example, the one or more other images could comprise a graphical overlay, etc., e.g. that is to be displayed together with the image.

One or more or each of the image(s) may also or instead be filtered, i.e. so as to generate one or more filtered images. Thus, in various embodiments, the set of one or more image processing stages also or instead comprises a filter (filtering circuitry) configured to filter an image to generate a filtered image. Equally, the set of one or more image processing operations may comprise filtering, and one or more or each of the output images may comprise a filtered image.

One or more or each of the image(s) may also or instead be rotated, i.e. so as to generate one or more rotated images. Thus, in various embodiments, the set of one or more image processing stages also or instead comprises a rotation stage (rotation circuitry) configured to rotate an image to generate a rotated image. Equally, the set of one or more image processing operations may comprise rotation, and one or more or each of the output images may comprise a rotated image. In these embodiments, one or more or each image may be rotated by any suitable and desired amount, such as, for example 90°, 180° and/or 270°.

Other image processing operation(s) include, for example, colour conversion, dithering, gamma correction, and so on.

As will be appreciated from the above, the set of one or more image processing stages may comprise one or more or all of: a scaler, a cropping stage, a flip stage, one or more image enhancement stages, a compositor, a filter, a rotation stage, and so on. Equally, the set of one or more image processing operations may comprise one or more or all of: scaling, cropping, flipping (mirroring), image enhancement, composition, filtering, rotating etc.

Once output images have been produced, each of the output images may be used in any suitable manner.

In various particular embodiments, each of the output images is displayed on one or more displays such as one or more display panels.

To do this, the image processing system may comprise one or more display controllers operable to provide images for display to each display. Each display controller may be configured to read output images from a memory in which the output images are stored. (This memory may comprise any suitable memory, but in particular embodiments is an external memory, such as the main memory of the overall image processing system.)

The output images may be displayed on a single display (e.g. panel) or on multiple displays (panels). For example, where there are multiple image sensors, a respective display may be provided and used in respect of (images taken by) each image sensor. Other arrangements would, however, be possible.

The image processing system may be configured such that the output images are displayed to the operator of the apparatus (e.g. vehicle), e.g. in a manner which allows the operator to use the displayed images when controlling the apparatus (e.g. vehicle).

Thus, in various embodiments, one or more or each of the one or more displays may be provided on or within the apparatus (e.g. vehicle) that is configured to move within the environment. Thus, for example, where the apparatus comprises a vehicle, the output images may be displayed to the operator (driver) on one or more displays (e.g. display panels) provided within the vehicle. In various particular embodiments, output images from each of two (or more) image sensors (cameras), e.g. which are configured and arranged to take images in the manner of the side mirrors of the vehicle, may be respectively displayed on two (or more) display panels provided within the vehicle, e.g. in the manner of rear-view mirrors and/or side mirrors.

Additionally or alternatively, each of the one or more displays may be provided remotely from the apparatus (e.g. vehicle), i.e. the output images may be displayed to the operator on one or more displays (e.g. display panels) which are remote from the apparatus (e.g. vehicle). This may be the case, for example, where the apparatus is a medical device or a remotely operated vehicle.

In various further embodiments, each of the output images may also or instead be used in some other manner, e.g. by one or more consumer circuits of the image processing system. For example, output images may be used by a machine learning system, e.g. to perform image recognition, etc., with respect to each image.

Other arrangements would be possible.

As described above, in various embodiments, the one or more processed images are displayed, e.g. on a display such as a display panel, e.g. for use by an operator when controlling the apparatus (e.g. vehicle). As such, image processing errors within these systems can significantly affect the safety of the apparatus (e.g. vehicle). Image processing errors can also be problematic in embodiments in which the output images are not displayed.

The image processing system accordingly further comprises processing circuitry configured to verify image processing performed by one or more image processing stages of the set of one or more image processing stages, i.e. to check whether (or not) the one or more image processing stages are (sufficiently) accurately performing their respective image processing operation(s).

This is done by inserting one or more probes (which may each have a unique, known configuration) into one or more images prior to the one or more images being processed by the one or more image processing stages of the set of one or more image processing stages (e.g. such that the one or more probes are subjected to the same image processing operations as the one or more images), and then attempting to identify the one or more probes in an output of the one or more processing stages.

The one or more image processing stages whose image processing is verified may comprise any suitable one or more image processing stages of the set. The one or more image processing stages whose image processing is verified may comprise any one or more of the above described image processing stages.

The image processing system may be configured to verify the image processing of a single image processing stage of the set of one or more image processing stages, or may be configured to verify the image processing of plural different (adjacent) image processing stages of the set.

In various embodiments, the image processing system is configured to verify the image processing of all of the stages of the set (i.e. to verify the image processing of the entire set of image processing stages), e.g. by inserting one or more probes into images that are to be processed by the set, and then attempting to identify one or more probes in an output of the set of image processing stages. In these embodiments, the method may comprise verifying the image processing of the set of one or more image processing stages, by: inserting one or more probes into the images taken by the one or more image sensors, processing the images taken by the one or more image sensors (together with the one or more probes) using the set of one or more image processing stages, and attempting to identify one or more probes in an output such as the output images.

However, in various other embodiments, the image processing system may be configured to verify the image processing of less than all of the stages of the set of image processing stages (i.e. to verify the image processing of a sub-set of the set of image processing stages).

In these embodiments, the image processing system may optionally be configured to verify the image processing of image processing stage(s) not included in the sub-set in any suitable manner, e.g. using one or more other techniques, as appropriate. This may be particularly suitable, for example, for processing stages which can be verified straightforwardly using other techniques.

In these embodiments, the image processing system may be configured to verify the image processing of any suitable sub-set of (e.g. adjacent) image processing stages of the set.

For example, the stage(s) whose image processing is verified may or may not include the first stage in the set. Where the stage(s) whose image processing is verified does include the first stage in the set, then the method may comprise verifying the image processing of the set of one or more image processing stages, by: inserting one or more probes into the images taken by the one or more image sensors. Where, however, the stage(s) whose image processing is verified does not include the first stage in the set, then the method may comprise verifying the image processing of the set of one or more image processing stages, by: inserting one or more probes into one or more processed versions of the one or more images taken by the one or more image sensors.

Equally, the stage(s) whose image processing is verified may or may not include the final stage in the set. Where the stage(s) whose image processing is verified does include the final stage in the set, then the method may comprise verifying the image processing of the set of one or more image processing stages, by: attempting to identify one or more probes in an output such as the output images. Where, however, the stage(s) whose image processing is verified does not include the final stage in the set, then the method may comprise verifying the image processing of the set of one or more image processing stages, by: attempting to identify one or more probes in processed versions of the images taken by the one or more image sensors that are to be further processed to produce the output images.

Thus, the one or more images into which the one or more probes are inserted may comprise the image taken by the one or more image sensors, or processed versions of those images. Equally, the output which is analysed in order to attempt to identify the one or more probes may comprise a final output such as the output images (e.g. for display), or an intermediate output such as images that are to undergo further processing in order to produce the output images.

It would also be possible for the image processing system to be configured to (independently) verify image processing performed by two or more different stages or groups of stages of the set, e.g. to verify the image processing performed by a first stage or group of stages of the set, and to independently verify the image processing performed by a second different stage or group of (different) stages of the set. This may be done by the image processing system inserting one or more first probes into images to be processed by the first stage or group and attempting to identify one or more first probes in an output of the first stage or group, and also inserting one or more second probes into images to be processed by the second stage or group and attempting to identify one or more second probes in an output of the second stage or group (e.g. in a corresponding manner).

This may be useful to verify a set of image processing stages where, e.g., the image processing performed by the set of stages is relatively complex, such that a probe cannot or is very unlikely to survive the entire set of stages.

Thus, the image processing system may be configured to verify image processing performed by one or more first image processing stages of the set of one or more image processing stages, by:

inserting one or more first probes into one or more images prior to the one or more images being processed by the one or more first image processing stages of the set of one or more image processing stages; and attempting to identify one or more first probes in an output of the one or more first processing stages.

The image processing system may also be configured to verify image processing performed by one or more second (different) image processing stages of the set of one or more image processing stages, by:

inserting one or more second probes into one or more images prior to the one or more images being processed by the one or more second image processing stages of the set of one or more image processing stages; and attempting to identify one or more second probes in an output of the one or more second processing stages.

The image processing system may also be configured to verify image processing performed by any number of one or more third (different) image processing stages of the set in a corresponding manner.

The one or more probes may be inserted into the images in any suitable manner.

The one or more probes should be (and in various embodiments are) inserted into the one or more images such that each of the one or more probes is processed by the one or more image processing stages of the set of one or more image processing stages (whose image processing is being verified), i.e. together with the one or more images. In other words, the one or more probes may be inserted into the one or more images such that each of the one or more probes undergoes the same (sequence of) processing operation(s) as the one or more images.

This means that the output of the one or more processing stages will include processed version(s) of one or more of the one or more probes (together with processed version(s) of the one or more images), e.g. where the one or more processed version(s) of the one or more probes have undergone the same image processing as the processed version(s) of the one or more images. The one or more processed version(s) of the one or more probes will accordingly be representative of the processing undergone by the one or more images in the output.

In various particular embodiments, the one or more probes are inserted directly into the one or more images (that are to be processed), i.e. using direct spatial encoding. To do this, the image data of the one or more images may be modified so as to include the one or more probes, e.g. in the manner of a digital watermark.

In these embodiments, one or more probes may be inserted into each (and every) image (that is to be processed by the one or more image processing stages) (e.g. of the sequence of images), or one or more probes may be inserted into only some (but not all) of the images (that are to be processed by the one or more image processing stages). For example, one or more probes may be periodically (or otherwise) inserted into images of the sequence of images.

In these embodiments, as the image(s) are to be used to generate the output image(s), it is desirable to minimise the effect of the image modifications due to the insertion of the probe(s) on the image(s). This can be achieved in any suitable manner.

For example, one or more or each of the probes may be removed (e.g. from the output of the one or more processing stages), prior to the output images being used (e.g. displayed).

Additionally or alternatively, one or more or each of the probes may be inserted into the images in such a way that their effect on the output of the one or more processing stages is relatively minor, e.g. such that it will be less noticeable (e.g. by the operator or consumer circuit).

In various particular embodiments, the one or more probes are inserted into the one or more images in such a way that only a small amount of image information of the image(s) is modified, e.g. per data position (pixel) of the image(s). In particular, the one or more probes may be inserted into the one or more images by using (and modifying) only a single bit per image data position (pixel).

In various particular embodiments, the bit that is used (modified) in this manner may be the least significant bit, e.g. of one of the colour channels. Any suitable colour channel may be chosen to do this, but in various embodiments the blue channel is used (modified), as the human eye is least sensitive to this colour channel.

Thus, in various embodiments, the one or more probes are inserted into an image by modifying the least significant bit of the data value of one (e.g. the blue) colour channel of one or more data positions (pixels) of the image. This has the effect of minimising (or at least reducing) the effect of the insertion of the probe(s) on the output image(s).

Other arrangements would be possible. For example, instead of using direct spatial encoding, an image may be transformed, and one or more probes may be inserted into the image in the transformed domain (and then the image may be transformed back again, i.e. using a reverse transform). For example, one or more probes may be inserted into an image using quantization index modulation (QIM). Other techniques could, however, be used.

In these embodiments, an image may be transformed to any suitable domain (for probe insertion). Example domains include Fourier, Cosine, Wavelet, etc. In these embodiments one or more transformations may be used. For example, an image may be transformed firstly to a Fourier domain, and then to a Wavelet domain for probe insertion (e.g. using QIM) (and then back again).

Other arrangements would be possible.

In some embodiments, where an image (taken by an image sensor) comprises regions that are e.g. saturated with a single colour (such as white), for example regions of an image showing clouds, it may be challenging to insert one or more probes directly into the image without causing noticeable artefacts in the final output image.

In this situation (and elsewhere), it may be desirable to omit one or more probes from being inserted into the image data (i.e. so as to avoid causing noticeable artefacts in the final output image).

In these embodiments, information indicating the manner in which the one or more probes are inserted into the image data may be communicated to the identification circuitry, e.g. so as to allow the output images to be verified appropriately. For example, the information may indicate one or more region(s) of an image which do not include a probe, optionally together with information indicative of a reason for the probe being omitted (such as information indicative of a particular property of the region that prevented a probe being inserted into that region). Conveying such information to the identification circuitry in this manner can permit, for example, the identification circuitry to verify that the property which prevented insertion of a probe into a region has been preserved by the image processing.

In various further embodiments, instead of inserting the one or more probes directly into the image data of the images, the one or more probes may be inserted into the one or more images by inserting one or more "test" images comprising the one or more probes into the sequence of images (that is to be processed), e.g. between (adjacent) images of the sequence of images. To do this, the sequence of images may be modified so as to include one or more additional images comprising the one or more probes, e.g. between images in the sequence of images.

In these embodiments, a test image may be inserted between each (and every) pair of adjacent images of the sequence (that is to be processed by the one or more image processing stages), or a test image may be inserted between only some (but not all) pairs of adjacent images of the sequence (that is to be processed by the one or more image processing stages). For example, a test image may be periodically (or otherwise) inserted between adjacent pairs of images in the sequence of images. Alternatively, a test image may be inserted between adjacent pairs of images in the sequence of images only occasionally, e.g. when needed or otherwise.

Each test image may be configured as desired. For example, a test image may be produced by modifying a relatively simple image, such as an image comprising a single colour value, in the manner described above (and further below), e.g. by inserting one or more probes into the image.

Thus, the step of inserting one or more probes into one or more images prior to the one or more images being processed may comprise: inserting one or more test images into a sequence of images prior to the sequence of images (and the test image(s)) being processed by the one or more image processing stages of the set.

In these embodiments, the test frames need not be (and in embodiments are not) used (e.g. displayed). Thus, once the test image(s) have been processed and analysed, i.e. to attempt to identify one or more probes in the processed test image(s), they may be discarded, i.e. without being used (e.g. without being displayed).

It would also be possible to combine both of the above methods (i.e. in which either one or more probes are inserted directly into the image data, or the one or more probes are inserted into test images). For example, the image processing system may be configured to switch between these techniques as appropriate and desired, e.g. when it is determined that one of the methods would provide improved results.

For example, where an image (taken by an image sensor) comprises regions that are e.g. saturated with a single colour (such as white), for example regions of an image showing clouds, it may be challenging to insert one or more probes directly into the image without causing noticeable artefacts in the final output image. In this situation (and elsewhere), instead of directly inserting one or more probes into the image data, one or more probes may be inserted into one or more test images in the manner described above. In these embodiments, information indicating the manner in which the one or more probes are inserted into the image data may be communicated to the identification circuitry, e.g. so as to allow the output images to be verified appropriately.

The one or more probes that are inserted into the one or more images may be configured in any suitable manner.

As described above, the one or more probes are processed by the one or more image processing stages of the set together with the one or more images, so that the output of the one or more processing stages includes processed version(s) of one or more probes (together with processed version(s) of the one or more images). The processed version(s) of the one or more probes in the output of the one or more processing stages are then used to verify the image processing performed by the one or more image processing stages of the set. As such, the one or more probes should be (and in various embodiments are) configured such that when it or they are subjected to image processing (together with the one or more images), image modifications to the probe(s) are representative of the image modifications made to the one or more images.

In various embodiments, the one or more probes are in the form of one or more images, i.e. each probe may be an image probe. However, one or more or each probe could instead have some other form, such as being a transformed image probe.

Where each probe comprises an image probe, each probe may comprise an array of plural data positions (pixels), with each data position (pixel) taking a particular data value. The data values for the data positions of each probe can be any suitable data values.

The one or more probes may have any suitable size and shape. The one or more probes may (together) have a size that is smaller than the image into which it or they are inserted. Thus, one or more probes may be inserted into one or more sub-regions (less than all of) of an image.

However, in various particular embodiments, the one or more probes are configured to have the same size as (i.e. to fill) the image into which it or they are inserted. As described further below, configuring the one or more probes to fill the image into which it or they are inserted increases the effectiveness of the image processing verification.

Each (set of) one or more probes should, and in an embodiment does, have an appropriate shape and/or features to allow the (set of) one or more probes to be identified, e.g. in the manner of a digital watermark. This can be achieved in any suitable and desired manner. For example, each (set of) one or more probes may be configured to have an appropriate two dimensional shape or pattern that allows the (set of) one or more probes to be identified.

In various particular embodiments (where one or more probes are inserted into each image in the sequence of images), the configuration of the one or more probes changes with time.

Thus, inserting one or more probes into one or more images prior to the one or more images being processed by the one or more image processing stages of the set of one or more image processing stages may comprise inserting one or more first probes into one or more first images prior to the one or more first images being processed by the one or more image processing stages of the set of one or more image processing stages, and then inserting one or more second different probes into one or more second different (subsequent) images prior to the one or more second images being processed by the one or more image processing stages of the set of one or more image processing stages. Inserting one or more probes into one or more images prior to the one or more images being processed by the one or more image processing stages of the set of one or more image processing stages may comprise inserting one or more third different probes into one or more third different (subsequent) images prior to the one or more third images being processed by the one or more image processing stages of the set of one or more image processing stages (and so on).

In various particular embodiments, the configuration of the one or more probes (that are sequentially inserted into each image in the sequence of images) is configured to change from one image to the next (i.e. on a frame-by-frame basis). In other words, a different (e.g. unique or quasi-unique) (set of) one or more probes may be inserted into each respective image in the sequence of images. In other words, a different (e.g. unique or quasi-unique) watermark may be inserted into each respective image in the sequence of images (where each watermark comprises a different (set of) one or more probes).

The one or more probes inserted into an image may comprise a single probe. Thus, the image processing system may be configured to insert a probe into an image (e.g. to insert a different probe into each image), and to attempt to identify the probe in the output of the one or more processing stages.

In these embodiments, each probe may have any suitable configuration. In various embodiments, a group of plural probes may be defined and used by the image processing system, where each probe in the group is distinguishable from any other probes in the group, so that each particular probe in the group of probes can be uniquely identified within the output. A different probe from the group may be inserted into each respective different image of the one or more images (e.g. into each respective different image in the sequence of images).

In these embodiments, the group of plural probes may be a finite group of probes, and so the image processing system may be configured to loop through the probes in the group, i.e. to insert a first probe of the group into a first image, to then insert a respectively different probe of the group into each subsequent image into which a probe is to be inserted (e.g. into each image of the sequence of images), (e.g. by stepping through probes of the group from one probe to the next), until a last probe in the group is inserted into an image, and to then insert the first probe of the group into a subsequent image (of the sequence of images) (and to continue by stepping through probes of the group from one probe to the next, and so on).

In various particular embodiments, the one or more probes inserted into an image comprise a set of plural probes. Thus, in various embodiments, the image processing system is configured to insert a (different) set of plural probes into each image, and to attempt to identify one or more or each probe of the set of plural probes in the output of the one or more processing stages.

In these embodiments, each probe inserted into an image is in an embodiment suitably distinguishable from any other probes inserted into the image, so that each particular probe in the set of probes can be uniquely identified (where present) within the output. Thus, in an embodiment, each probe in a set of plural probes is uniquely identifiable within the set of plural probes (and is distinguishable from all the other probes in the set).

In various particular embodiments, a group of plural probes is defined and used by the image processing system (where each probe in the group is distinguishable from any other probes in the group, so that each particular probe in the group of probes can be uniquely identified, e.g. within the output), and each set of plural probes that is inserted into an image is made up of a (different) combination (sub-set) of probes from the group. Thus, in an embodiment, a group of plural probes is defined and used by the image processing system (where each probe in the group is uniquely identifiable within the group, and is distinguishable from all the other probes in the group), and a (different) combination (sub-set) of probes from the group is inserted into each image.

Where, as described above, the group of plural defined probes is a finite group of defined probes, inserting different combinations (sub-sets) of probes from the group into each image in this manner allows a much larger pool of different combinations of probes (i.e. watermarks) to be defined and used (e.g. when compared to only inserting a single probe into each image). This means that, where the image processing system is configured to loop through the sets of probes in the pool (in a corresponding manner to that described above), each unique set of probes (each unique watermark) is beneficially used with less frequency than would otherwise be the case.

As will be described further below, the use of sets of plural probes can also increase the effectiveness of the image processing verification.

Where a set of plural probes is inserted into an image, each probe of the set may be arranged at a particular location within the image. Each probe of the set may in an embodiment be arranged at a different location within the image to any other probe of the set.

The size, shape and number of the plural probes may be chosen so as fill less than all of (only one or more sub-regions of) the image into which the probes are inserted. However, in various particular embodiments, the size, shape and number of probes is chosen to fill the image. Thus, the set of plural probes may together have a size that is equal to the image into which they are inserted.

In various particular embodiments, the plural probes of a set may each be distributed throughout the image, such as being evenly (spatially) distributed throughout the image. For example, where two probes are inserted into an image, each of the probes may be inserted into each half (side) of the image. Where four probes are inserted into an image, each probe may be inserted into a respective quadrant of the image, and so on.

In various particular embodiments, the set of plural probes that is inserted into each image comprises a set of plural probes that are evenly (spatially) distributed throughout the image and configured to fill the image, e.g. an array of probes.

Each probe should, and in an embodiment does, have an appropriate shape and/or features to allow the probe to be identified. This can be achieved in any suitable and desired manner. For example, each probe may be configured to have an appropriate two dimensional shape or pattern that allows the probe to be identified. Each probe may, for example, comprise a square or rectangular array of data positions having a two-dimensional pattern that allows the probe to be identified.

In the technology described herein, an attempt is made to identify one or more probes in an output of the one or more processing stages.

As described above, the one or more probes inserted into an image are subjected to the same image processing as the one or more images. Thus, attempting to identify one or more probes in the output of the one or more processing stages may comprise attempting to identify one or more processed versions of the one or more probes (that were inserted into the one or more images) in the output.

As described above, the output may comprise one or more images such as a sequence of images, where each output image may comprise an output image (e.g. for display) or an output image that is to be further processed to produce an output image. Thus, attempting to identify one or more probes in the output of the one or more processing stages may comprise attempting to identify one or more probes in one or more or each output image of the output of the one or more processing stages.

The manner in which the attempt to identify the one or more probes is made will depend on the manner in which the one or more probes were inserted into the image(s). For example, where the one or more probes were directly inserted into the image(s), then the output of the one or more processing stages may be analysed directly to try to detect (processed versions of) the one or more probes. It may alternatively be necessary to transform an output image before attempting to identify one or more probes in the transformed domain.

The nature of the image processing performed by the one or more image processing stages may be such that each (all) of the one or more probes that were inserted into an image are expected to appear in the output. Alternatively, the nature of the image processing may be such that one or more of the one or more probes that were inserted into an image are not expected to appear in the output, e.g. where the image processing operations include cropping and/or (down-) scaling, etc.

Thus, attempting to identify one or more probes in the output may comprise either attempting to identify each (all) of the one or more probes inserted into the one or more images, or attempting to identify only a sub-set of (less than all of) the one or more probes inserted into the one or more image.

In various particular embodiments, attempting to identify one or more probes in the output comprises attempting to identify one or more expected probes in the output, where each expected probe is a probe that, based on the image processing of the one or more image processing stages, is expected to appear in the output.

Where one or more of the one or more (expected) probes cannot be identified in the output, then it may be determined that the one or more image processing stages have not (sufficiently) accurately performed their image processing operation(s).

This may be the case where, for example, the image processing has caused the output image(s) to become overly blurred, corrupted and/or noisy. Such inaccuracies in the image processing will be reflected in the processed version(s) of the one or more probes in the output, and may lead to the image processing system being unable to identify one or more of the one or more probes (i.e. since they are "illegible").

Thus, when one or more or each of the one or more (expected) probes can be identified in the output, it may be determined that the output of the one or more processing stages is not (is other than) overly blurred, corrupted and/or noisy.

Equally, the processing circuitry may be configured to verify the image processing performed by one or more image processing stages of the set of one or more image processing stages by:

verifying that the output of the one or more processing stages is not (is other than) overly blurred, corrupted and/or noisy when one or more or each of the one or more (expected) probes can be identified in the output.

The processing circuitry may be configured to determine that the output is overly blurred, corrupted and/or noisy when one or more or each of the one or more (expected) probes cannot (can other than) be identified in the output.

This may also be the case where, for example, the image processing has cropped and/or scaled the image in an incorrect manner. Such inaccuracies in the image processing may result in unexpected probe(s) appearing in the output and/or expected probe(s) not being present in the output.

Thus, when each of the one or more expected probes (and no unexpected probes) can be identified in the output, it may be determined that the output of the one or more processing stages has been cropped and/or scaled in an expected manner.

Equally, the processing circuitry may be configured to verify the image processing performed by one or more image processing stages of the set of one or more image processing stages by:

verifying that the output of the one or more processing stages has been cropped and/or scaled in an expected manner when each of the one or more expected probes (and no unexpected probes) can be identified in the output.

The processing circuitry may be configured to determine that the output has been cropped and/or scaled in an unexpected manner when one or more of the one or more expected probes cannot be identified in the output (and/or when one or more unexpected probes can be identified in the output).

This may also be the case where, for example, the output from the one or more processing stages does not correspond to the input one or more images. This could possibly happen, for example, where (as described above) the image processing system comprises plural different image sensors, and the same one or more image processors are configured to process images from plural different image sensors. For example, images from one image sensor could be (unintentionally) swapped with images from another image sensor.

Thus, when one or more or each of the one or more (expected) probes (and no unexpected probes) can be identified in the output, it may be determined that the output of the one or more processing stages corresponds to the input one or more images to the one or more processing stages.

Equally, the processing circuitry may be configured to verify the image processing performed by one or more image processing stages of the set of one or more image processing stages by:

verifying that the output of the one or more processing stages corresponds to the input one or more images to the one or more processing stages when one or more or each of the one or more (expected) probes (and no unexpected probes) can be identified in the output.

The processing circuitry may be configured to determine that the output does not correspond to (other than corresponds to) the input one or more images to the one or more processing stages when one or more or each of the one or more (expected) probes cannot be (can other than be) identified in the output.

Thus, the processing circuitry may be configured to verify that the output is an expected output, e.g. originating from an expected image sensor.

As described above, in various embodiments, where one or more (different) probes are inserted into each image in the sequence of images, the configuration of the one or more probes may change with time.

Including a time-varying watermark in each image in the sequence of images in this manner allows the image processing system to verify that the output of the one or more processing stages is changing in time (e.g. has not frozen). This also allows the image processing system to verify that the images (frames) of the output of the one or more processing stages are produced with an expected (e.g. sufficient) rate (i.e. frame rate). This can also allow the image processing system to verify that the images of the output of the one or more processing stages are produced in a correct order.

Thus, in various embodiments, the processing circuitry is configured to verify image processing performed by one or more image processing stages of the set of one or more image processing stages, by:

inserting respectively different (sets of) one or more probes into each image of a sequence of images prior to the sequence of images being processed by the one or more image processing stages of the set of one or more image processing stages; and attempting to identify each of the different (sets of) one or more probes in the output of the one or more processing stages.

When each of the (sets of) one or more (expected) probes can be identified in the output, it may be determined that the output of the one or more processing stages is changing in time, is being produced at an expected rate, and/or is being produced in a correct order.

Equally, the processing circuitry may be configured to verify the image processing performed by one or more image processing stages of the set of one or more image processing stages by:

verifying that the output of the one or more processing stages is changing in time, is being produced at an expected rate, and/or is being produced in a correct order when each of the (sets of) one or more (expected) probes can be identified in the output.

The processing circuitry may be configured to determine that the output is not changing in time (is frozen), is being produced at an unexpected (e.g. slow) rate, and/or is being produced in an incorrect order when one or more or each of the (sets of) one or more (expected) probes cannot be identified in the output (and/or when one or more or each of the (sets of) one or more (expected) probes can be identified as appearing in the output at an unexpected (e.g. slow) rate, and/or in an incorrect order).

The nature of the image processing should be such that one or more of the one or more probes that are inserted into the one or more images are expected to appear in the output at a particular spatial location (e.g. relative to an output image or relative to one or more other probes in the output image). This may be the case, for example, where (as described above) an image is flipped or rotated.

Thus, when one or more or each of the one or more (expected) probes can be identified in the output at an expected spatial location, it may be determined that the output of the one or more processing stages has been correctly flipped and/or rotated.

Equally, the processing circuitry may be configured to verify the image processing performed by one or more image processing stages of the set of one or more image processing stages by:

verifying that the output of the one or more processing stages has been correctly flipped and/or rotated when each of the one or more (expected) probes can be identified in the output at an expected location.

The processing circuitry may be configured to determine that the output has been incorrectly flipped and/or rotated when one or more or each of the one or more (expected) probes cannot be identified in the output at an expected location and/or can be identified in the output at an unexpected location.

It will accordingly be appreciated from the above that, where one or more expected probes cannot be identified in the output (or where one or more expected probes is identified in an unexpected temporal and/or spatial position within the output, or where one or more unexpected probes is identified in the output), then it may be determined that the one or more image processing stages have not (sufficiently) accurately performed their image processing operation(s). Where, on the other hand, each of one or more expected probes can be identified in the output (e.g. at respective expected temporal and/or spatial position(s)) (and where no unexpected probes are identified in the output), then it may be determined that the one or more image processing stages have (sufficiently) accurately performed their image processing operation(s).

Thus, attempting to identify one or more probes in the output of the one or more processing stages allows the image processing system to determine the fidelity with which the one or more image processing stages have performed their image processing operation(s).

As the one or more processing stages are part of a set of processing stages which set is configured to produce output images (e.g. for display) from the images taken by the image sensor(s), this in turn allows the image processing system to determine whether (or not) the output images are a sufficiently accurate representation of the environment. Where the output images are determined not to be a sufficiently accurate representation of the environment, the image processing system may indicate this, e.g. to the operator and/or consumer circuit, so as to prevent the images being used (e.g. by the operator and/or consumer circuit), e.g. in an inappropriate or unsafe manner.

Embodiments accordingly provide a relatively straightforward and robust technique for verifying image processing operations performed by one or more image processors.

It will be appreciated, therefore, that various embodiments provide an improved image processing system.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Embodiments of the technology described herein will now be described.

Embodiments relate to an image processing system safety monitor.

Automotive Mirror Replacement systems have been designed to replace or supplement the (e.g. exterior) mirrors of a vehicle (such as the side mirrors) with a camera-based system. Images taken by an image sensor or a camera are modified by an image processor in order to be displayed in an appropriate form to the vehicle operator on a display panel.

The Applicants have determined that in order for such a system to meet the appropriate automotive safety standards, the system will need, for example, to operate consistently with a relatively high frame rate. The system will also need to be configured to take (capture) images using a higher resolution and/or larger size than would be possible or convenient to display on panels within the vehicle.

For example, images may need to be taken at a relatively high resolution and/or with a relatively large size where the optical system is configured to provide a wide field of view in a manner which requires dewarping of the captured images (e.g. where a fisheye lens or similar is used), whereas the images may need to be displayed at a lower resolution and/or reduced size in accordance with a maximum resolution and/or size of the panel(s). Similarly, images may need to be taken at a relatively high resolution and/or with a relatively large size in order to allow techniques such as automatic image recognition to be performed on the image, whereas the images may need to be displayed at a lower resolution and/or reduced size in accordance with a maximum resolution and/or size of the panel(s). Similarly, images may need to be taken at a relatively high resolution and/or with a relatively large size in order to implement "dynamic mirror" techniques, where only part of the captured image (e.g. a central region of the image) may be displayed in a "normal" mode, but where additional parts of the captured image (e.g. a side region) may be displayed at other times, such as when the vehicle is turning.

As such, it may be necessary to downscale and/or to crop images taken by the image sensors. For example, magnification of around 0.19 to 0.3 may be needed.

The images may also need to be flipped, i.e. so as to generate the mirror-image of the images, e.g. where the images are being displayed for use by the vehicle's driver in the manner of a rear view or side mirrors. The images may also need to be enhanced, e.g. so as to improve intelligibility of the displayed images to the driver of the vehicle. Other image processing operations may be needed or desired.

This means that in these systems, the captured images need to be processed by one or more image processors.

Thus, as show in FIG. 1, images taken by an image source 10 such as a camera (e.g. of an environment surrounding the vehicle) may be subjected to a set of one or more image transformations by one or more image processors 12 in order to produce output images for display. The image source 10 and the image processor(s) 12 may be controlled by a controller 14, e.g. to indicate to the image source 10 when it should provide the next frame to the one or more image processors 12 for processing, and to control a mode of operation of the one or more image processors (e.g. to select a particular set of or configuration of one or more image transformations that are to be applied to a particular frame). The output images for display may then be provided to an image destination 16 such as a display.

The Applicants have recognised that a number of possible processing errors can arise in such systems, and that such processing errors can significantly affect the safety of the vehicle.

For example, where multiple image processors are used to perform the desired set of image processing operations, intermediate image data will need to be written out from one image processor so as to be read in (and processed) by another image processor. That is, multiple image processors may be arranged in a pipeline configuration, where intermediate images are stored and/or buffered in memory.

Equally, where there are two (or more) images sensors, it may be desired to use only a single image processor (or set of image processors) to process both image feeds. As such, images from one image sensor may need to be buffered, e.g. while images from the other image sensor are processed.

However, the use of buffering (amongst other things) means that there is a potential for images or parts of images to be delayed. This can cause, for example, a relatively slow frame rate, which is problematic in terms of safety. Furthermore, parts of an image and/or different images (frames) in a sequence of images can arrive out of order. This can cause distortions to the displayed image, which again is problematic in terms of safety. Other image processing error can also arise.

Similar problems can also arise where the image processing is performed in software.

A need therefore exists to configure the image processing system for safety.

A conventional approach for doing this would be to, in effect, over-engineer the system, e.g. by exhaustive analysis of the system to define potential hazards, the inclusion of redundant checking, etc. However, this would require significant engineering, and would lead to larger chips, that require more power and cost, etc.

The technology described herein provides a monitor that can verify that image transformations applied within a processing pipeline are plausibly correct for safety-relevant applications.

One or more probes or "watermarks" are inserted into images at the start of the processing pipeline for those images. The end result is then verified by observing the output from the pipeline, e.g. so as to check the transformations etc. applied by the pipeline.

The technology described herein can be used to provide either an additional integrity check for hazardous situations (e.g. in addition to conventional techniques), or a means to monitor the system as a whole without additional high-integrity engineering.

Figure 2:
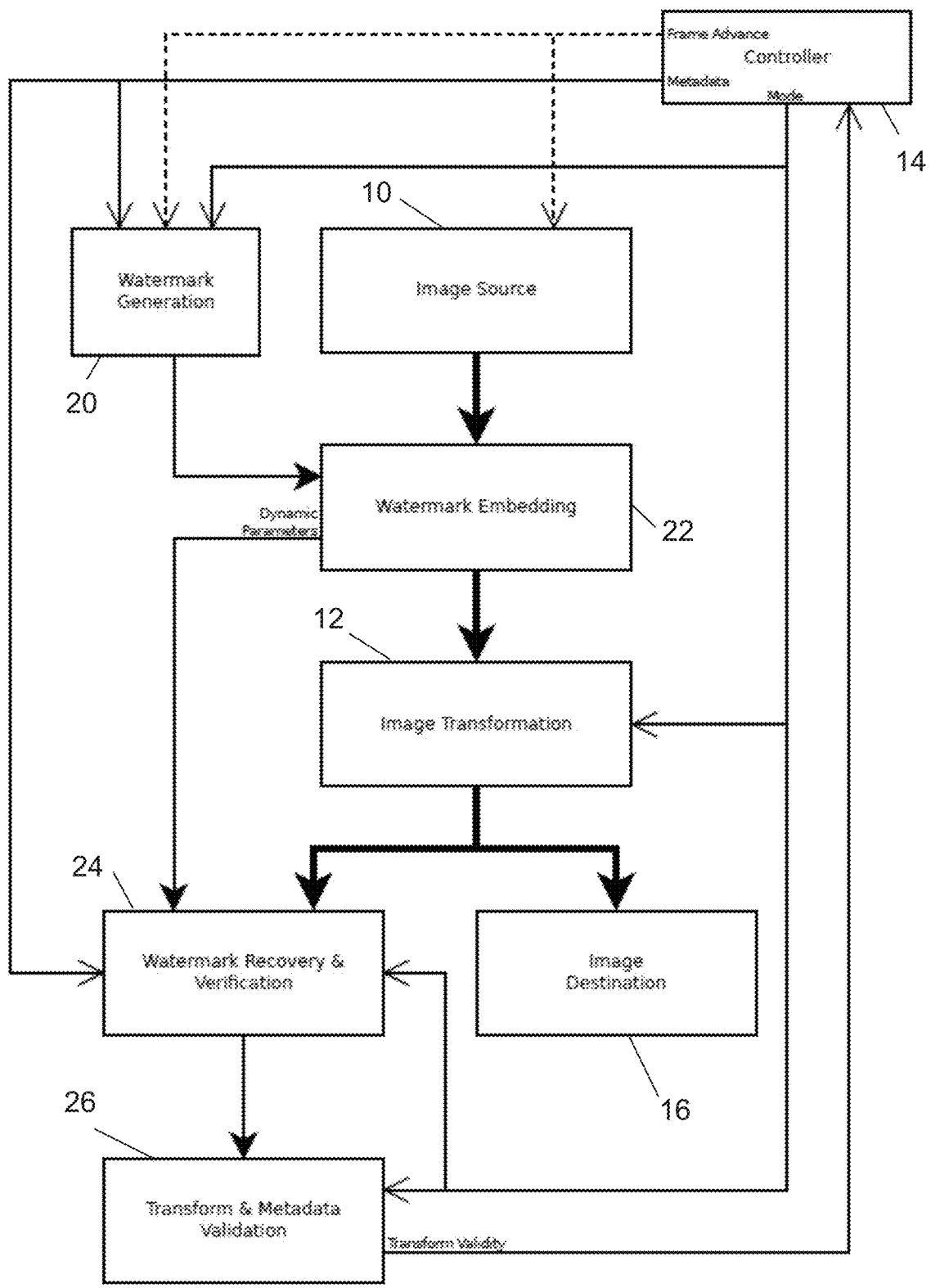
FIG. 2 shows schematically an image processing system configured in accordance with the technology described herein.

FIG. 2 shows schematically an embodiment. As shown in FIG. 2, the image processing system includes a watermark generation stage 20, which operates under control on the controller 14 to generate a watermark for each frame generated by the image source 10.

A watermark embedding stage 22 is configured to embed each watermark into each frame generated by the image source 10. The frames with their embedded watermarks are then passed to the image processor(s) 12, and subjected to appropriate image transformations before being provided to the image destination 16 (e.g. display) for display.

The image processing system also includes a watermark recovery and verifications stage 24. The transformed images (including the watermarks) are provided to the watermark recovery and verifications stage 24, and the watermark recovery and verifications stage 24 is configured to attempt to recover and verify (i.e. identify) watermarks in the images. This may be done by firstly attempting to identify the presence of a watermark in the image, and then attempting to identify that particular watermark (from a group of known, defined watermarks). As shown in FIG. 2, the watermark recovery and verifications stage 24 uses metadata describing each watermark together with information indicative of the mode of operation of the one or more images processors 12 in its analysis.

The image processing system also includes a transform and metadata validation stage 26, which is configured to determine whether (or not) the one or more image processing stages are (sufficiently) accurately performing their respective transformations. This is done by analysing the processed watermarks in conjunction with the information indicative of the mode of operation of the one or more images processors 12, i.e. to determine whether each watermark appears at an expected temporal and spatial position.

As the watermarks are subjected to the same image transformations as the frames, by analysing the transformed watermarks in the output frames, the system can check whether (or not) the one or more image processing stages are (sufficiently) accurately performing their respective transformations.

Where a watermark cannot be identified in the output (or where a watermark is identified in an unexpected temporal or spatial position within the output), then it may be determined that the one or more image processing stages have not (sufficiently) accurately performed their image processing transformations. Where, on the other hand, a watermark can be identified in the output (at an expected temporal and/or spatial position), then it may be determined that the one or more image processing stages have (sufficiently) accurately performed their image processing transformations.

Thus, attempting to identify the watermarks in the output of the one or more processing stages allows the image processing system to determine the fidelity with which the one or more image processing stages have performed their image transformations. This in turn allows the image processing system to determine whether (or not) the displayed images are a sufficiently accurate representation of the environment.

Embodiments accordingly provide a relatively straightforward and robust technique for verifying image processing transformations performed by the one or more image processors 12.

Figure 3:
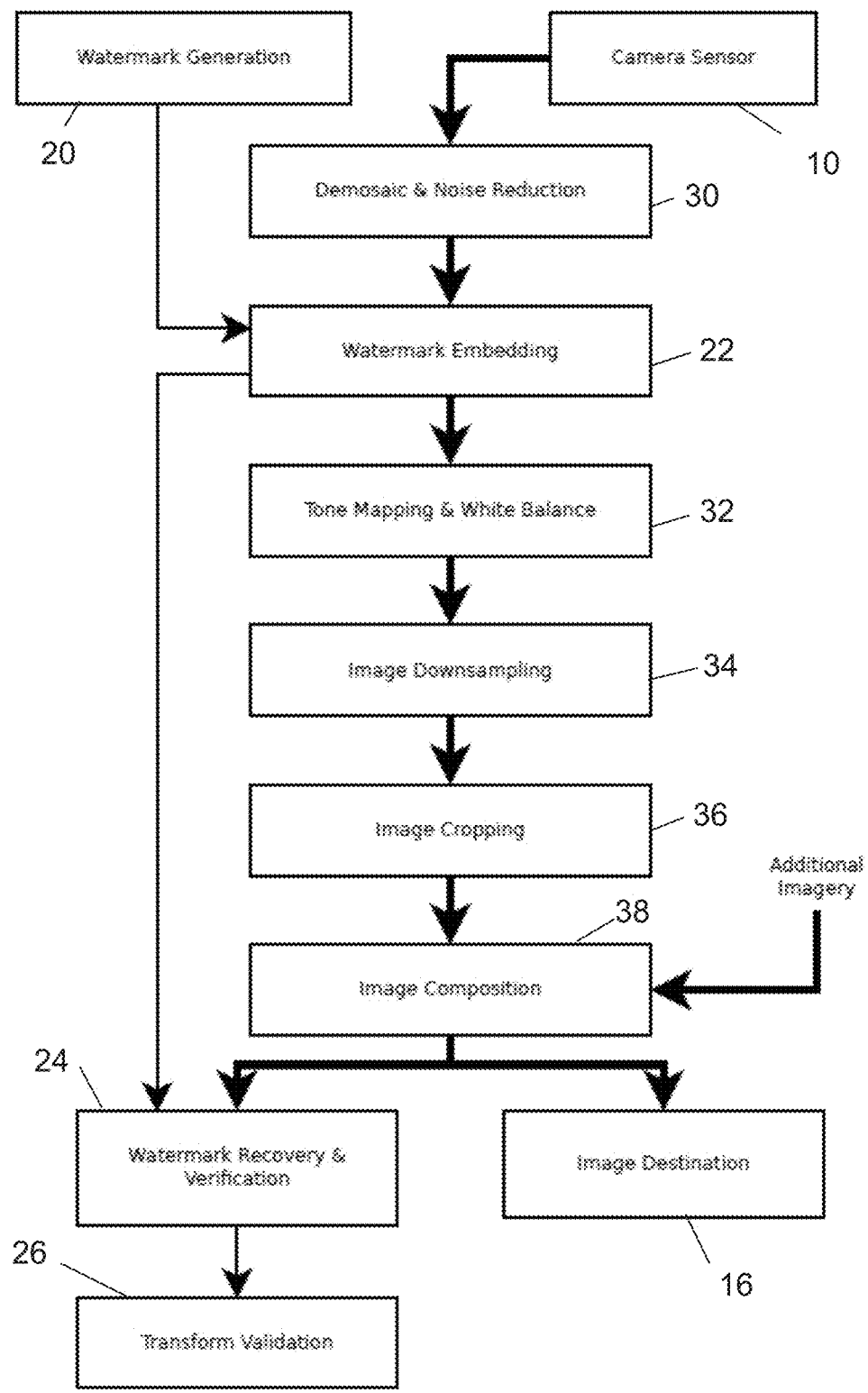
FIG. 3 shows schematically an image processing system configured in accordance with the technology described herein.

FIG. 3 shows in more detail the image processing system of FIG. 2 in accordance with an embodiment. FIG. 3 shows in detail a sequence of image processing operations (transformations) that may be applied to images produced by the source 10 (e.g. camera) before they are provided to their destination 16 (e.g. display).

As shown in FIG. 3, the images may be subjected to one or more or all of: demosaic and noise reduction 30, tone mapping and white balancing 32, scaling such as downsampling 34, image cropping 36, and/or image composition 38. Other types of image processing, and other pipelines would of course, be possible.

In some embodiments, the entire sequence of transformations is verified. However, more generally, the monitor may operate at the individual stages within a processing pipeline, group of stages and/or on the whole pipeline at once. Thus, various embodiments provide a system-level monitor to track the transformations applied either by each IP block, group of blocks, or by the media pipeline as a whole.

For example, as shown in FIG. 3, the watermark may be embedded 22 after one or more of the transformations have been applied.

Where a particular processing pipeline is relatively complex (such that no watermark can survive it sufficiently well to be useful), sub-sections of the pipeline can be verified using the techniques of the technology described herein. Thus, the process can be performed for a first sub-set of processing stages of the pipeline, and the process can be performed for a second different sub-set of the processing stages of the pipeline (and so on).

In the present embodiments, the watermarks are constructed as machine-readable information in a set of spatially distributed probes (where each probe comprises a square or rectangular grids of pixels), and are embedded into the images fed into the pipeline image using steganographic techniques. This information is recovered at the end of the pipeline.

A finite set of square or rectangular probes may be defined, and multiple such probes may be inserted into each frame. Thus, each watermark may be made up of a particular set of multiple probes. This allows a relatively large set of unique watermarks to be defined using a relatively small amount of information.

Each watermark may comprise any number of these probes. For example, a probe may be inserted into each quadrant of an image. It can then be determined whether (or not) the watermark appears as expected in each quadrant of the processed image at the end of the pipeline. This would allow, for example, the system to determine whether a correct reflection has been applied, and whether the truncation (cropping) and/or resizing has been correctly applied.

However, this would not allow, for example, detection of errors at the centre of the image. Therefore, in another embodiment, multiple probes are embedded in each image such that the probes cover most or all of the image.

Figure 4:
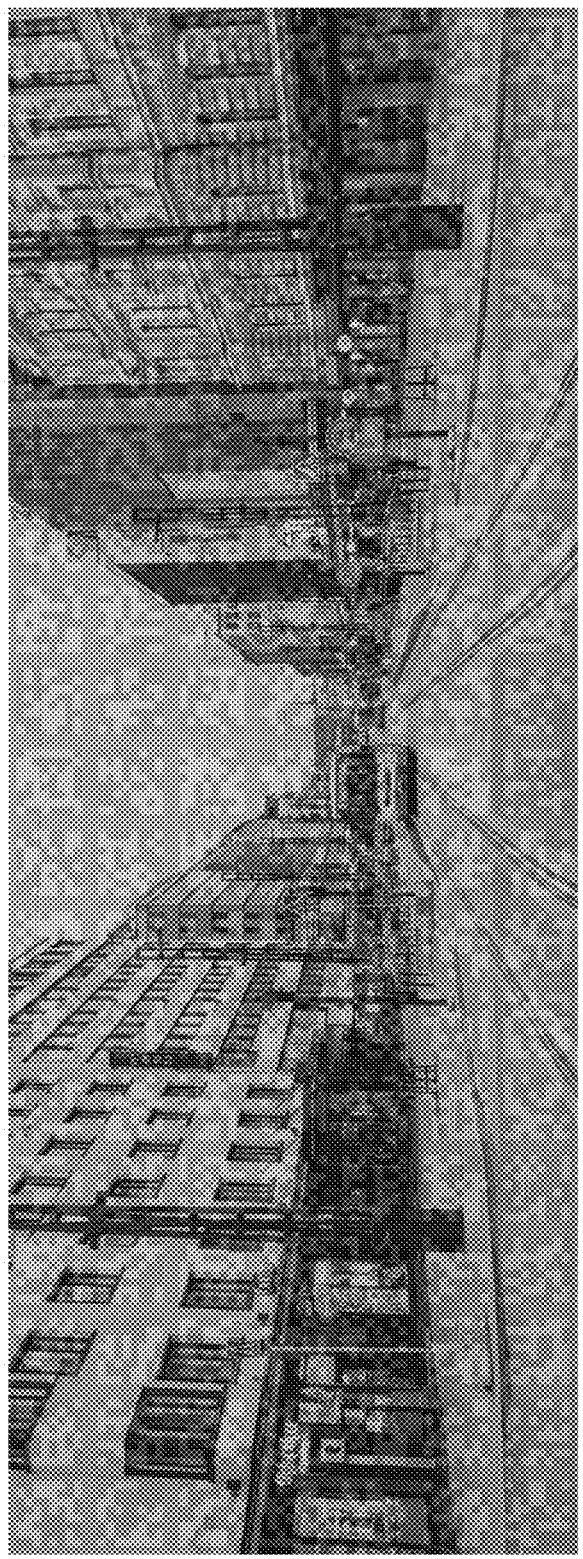
FIG. 4 shows conceptually an image having an embedded digital watermark.

FIG. 4 shows conceptually an image having an embedded watermark. As shown in FIG. 4, the image's watermark is constructed from an array of probes which are spatially distributed in the image.

Since plausibility only is required, successful decoding of the embedded array of probes permits verification, for example, that: (a) the probes which are expected to survive the pipeline are evident in the result, (b) that the probes that are expected to survive the transform are located in the proper place in the result, (c) that probes which originate from the left region of the input image appear on the right of the result where a reflection is expected, and/or (d) that the constituent pixels of probes which are expected to be reflected are swapped left/right.

Each watermark may be inserted into an image using direct spatial encoding, e.g. by modifying the least significant bit (LSB) of the data value of one colour channel of each pixel of the image. For example, for RGB colour values, the least significant bit of the blue channel may be modified, as the human eye is least sensitive to the blue channel. This has the effect of minimising (or at least reducing) the effect of the insertion of the watermark on the displayed image.

In this embodiment, the embedded information can be extracted directly by analysing the least significant bit (LSB) of the modified colour channel.

Various other techniques can be used to embed watermarks into the images. For example, difference expansion techniques may be used.

In some embodiments, a watermark may be inserted into an image by transforming the image, and inserting the watermark into the transformed version of the image (and then reverse transforming the image). For example, watermarks can be inserted using quantization index modulation (QIM).

In these embodiments, an image may be transformed to any suitable domain for watermarking. Example domains include Fourier, Cosine, Wavelet, etc. Equally, one or more transformations may be used. For example, an image may be transformed firstly to a Fourier domain, and then to a Wavelet domain for watermarking (e.g. using QIM) (and then back again). Other arrangements would be possible.

The Applicants have also recognised that there may be situations where it may be desirable to use watermarking techniques other than those described above. For example, where an image comprises regions that are e.g. saturated with a single colour (such as white), for example in regions of an image showing clouds, it can be challenging to perform watermarking without causing noticeable artefacts in final the displayed image.

In this situation (and elsewhere), instead of modifying the image themselves to include watermarks, test frames may also or instead be inserted (e.g. interleaved) in the image stream. Each test frame can be configured so as to be non-hostile to the watermarking, and the watermarks can be embedded in these images in addition to or instead of the original captured images. For example, each test frame could be a synthetic, e.g. mid-grey, image.

The test frames may be embedded in the image stream such that the test frames undergo the same processing as the original captured images. However, the test frame need not be displayed.

Additionally or alternatively, the watermark may be removed from the image prior to the image being displayed, i.e. the watermark may be a reversible watermark.

Figure 5:
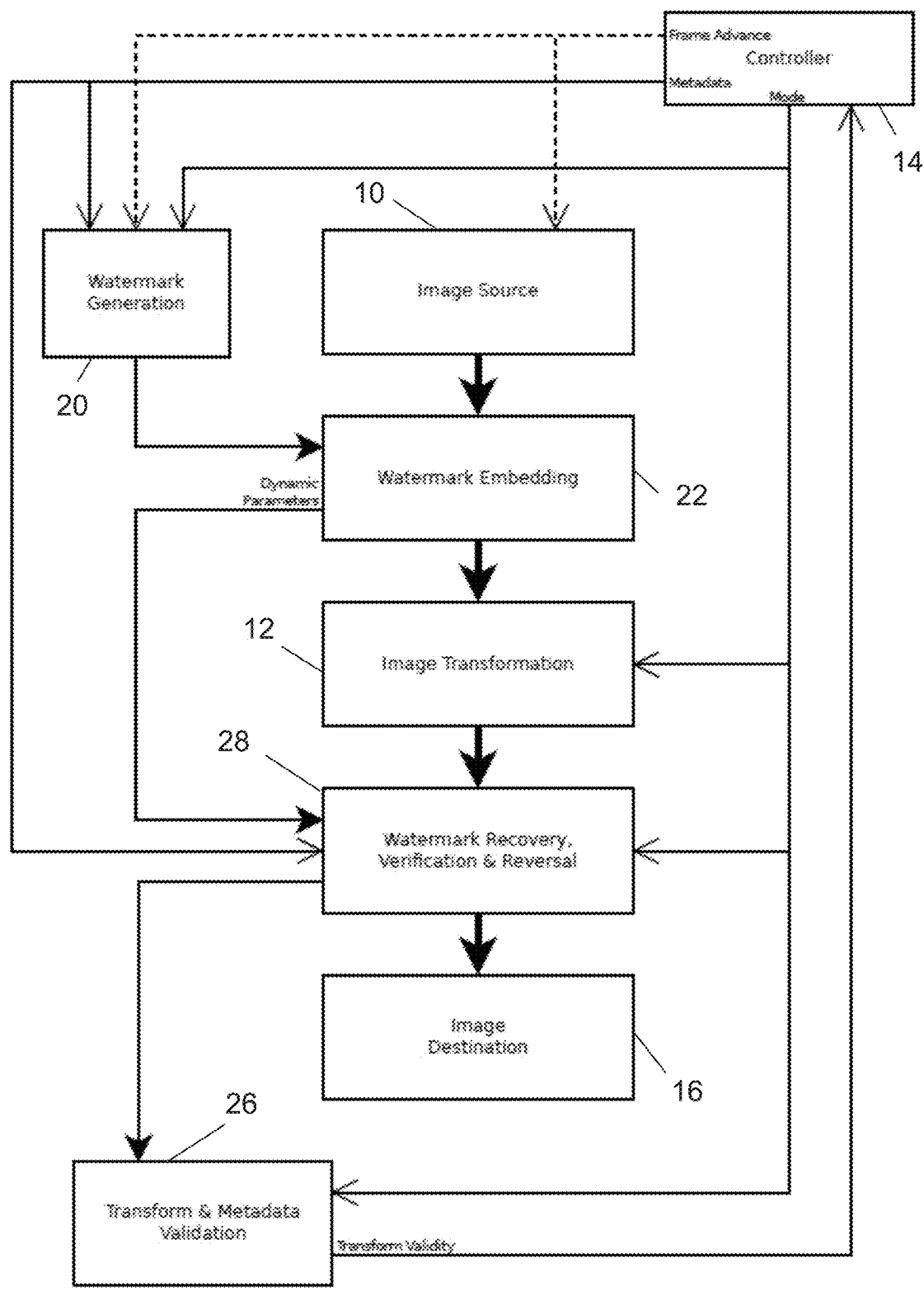
FIG. 5 shows schematically an image processing system configured in accordance with the technology described herein.

FIG. 5 shows an embodiment of an image processing system configured in this manner. The embodiment of FIG. 5 is similar to the embodiment of FIG. 2, in that the image processing system includes a watermark generation stage 20, a watermark embedding stage 22, and one or more image processor(s) 12.

However, in the embodiment of FIG. 5, the watermark recovery and verifications stage 24 is replaced with a watermark recovery, verifications and reversal stage 28, which as well as being configured to recover and verify watermarks in the output of the pipeline, is also configured to remove the watermarks, prior to the images being displayed.

It would also be possible, for example, not to include a watermark in frames or regions of frames for which watermarking could cause noticeable artefacts (such as saturated white regions).

As shown in FIGS. 2 and 5, in these embodiments (and otherwise), the watermark embedding stage 22 (encoder) can provide information (e.g. in the form of metadata) indicating how it has processed a particular frame or frame region to the watermark recovery and verification stage 24, 28 (decoder).

For example, the watermark embedding stage 22 can provide information (metadata) indicating that a watermark has not been included in a particular frame or frame region to the watermark recovery and verification stage 24, 28. The watermark recovery and verification stage 24, 28 can then use this information in its analysis.

For example, for a frame or frame region that should not include a watermark, the watermarks recovery and verification stage 24, 28 can at least determine whether or not this is the case. (This may be useful since a natural image without a watermark may, in general, always decode as if something is there; and it may not be possible to discriminate between the absence of a watermark and the presence of a very damaged watermark, since entropy is high in both cases.) This result of this determination can then be provided to the validation stage 26 and used in its analysis, in the manner described above.

The metadata may also or instead be used to communicate the reason for omitting a probe, and this may be verified in the output. For example, metadata may be communicated indicating that the majority of the probe area is at a maximum/minimum value (per colour channel). Thus, this property of the image may be verified (within tolerance) at recovery.

As described above, a number of possible hazards exist in Automotive Mirror Replacement systems.

For example, one potential hazard is a blank screen, i.e. where no image is displayed.

This may be considered as being a low risk hazard, since the vehicle operator can readily determine that the functionality is unavailable. However, under specific usage conditions this may be dangerous.

The use of a time varying watermark (as described above) permits verification that frames delivered to the display contain a valid watermark.

Another potential hazard is a frozen image, i.e. where the displayed image does not change to reflect changes in the physical environment. For example, the display may show an empty road when a vehicle is actually approaching. The display may show a stationary vehicle which has already passed.

This may be considered as being a high risk hazard, since the displayed image can be plausible under some circumstances and thus likely to be trusted by the vehicle operator.

The use of a time varying watermark (as described above) permits verification that frames delivered to the display are different, and delivered in the correct order.

Another potential hazard is a blurry/corrupted image. A blurry image is one in which detail/fidelity is diminished; details which should be visible may not be visible. A corrupted image is one in which all or part of the image contains data which is uncorrelated with the scene, i.e. where the corrupted pixels are either random or are from elsewhere in the image. Corruption can occur for single pixels or larger groupings of pixels.

Blurring/corruption can mask the presence of another road user or obstacle. In both cases there is a risk that the effect is subtle (e.g. since it may be confined to small areas, or image patches may be plausibly displaced from elsewhere) and that the driver will not notice the fault.

The use of a time varying watermark (as described above) permits verification that frames delivered to the display contain the watermark with sufficient legibility.

Another potential hazard is a noisy image. A noisy image is one in which spatially/temporally uncorrelated random pixels are modulated by a random signal.

Here, there may be a moderate risk that the loss of fidelity obscures important detail. However, this may be mitigated by a high probability that the vehicle operator will recognize severe noise. In severe cases, this can be similar to the blank screen hazard.

The use of a time varying watermark (as described above) permits verification that frames delivered to the display contain the watermark with sufficient legibility.

Another potential hazard is a failure to emulate mirror physics (image non-reversal). The mirror systems drivers are accustomed to "flip" images from left-to-right. The mirror replacement system may emulate this behaviour to avoid adding cognitive load to the driver.

Failure to emulate this is considered as being a high risk hazard, since the displayed image can be plausible under many circumstances, and thus likely to be trusted by the vehicle operator.

The use of a watermark (as described above) permits verification that frames delivered to the display have appropriate spatial arrangement of watermark probes.

Another potential hazard is where an incorrect spatial region is displayed, i.e. where a plausible image is displayed but of the incorrect spatial region. This is considered as being a medium risk hazard, since the system may have only one mode of operation, permitting easier detection by the operator.

The use of a watermark (as described above) permits verification that frames delivered to the display have the appropriate subset of watermark probes.

Another potential hazard is where an incorrect magnification factor applied, i.e. where a plausible image is displayed but vehicles are larger/smaller than expected, thereby misleading the driver about their distance. This is considered as being a medium risk hazard, due to the elevated risk of misjudged distance.

The use of a watermark (as described above) permits verification that frames delivered to the display have appropriate subset of watermark probes.

Another potential hazard is where left/right camera images are swapped, i.e. images captured on the left side of the vehicle are displayed as if captured on the right, and vice versa. This is considered as being a high risk hazard, since the driver's judgement can be impaired, possibly resulting in unsafe manoeuvres. Since the displayed image is plausible under many circumstances it is likely to be trusted by the vehicle operator.

The use of a time varying watermark (as described above) permits verification that frames delivered to the display originate from the correct sources.

In the present embodiments, where it is determined that an image contains errors, an action may be taken. The nature of the action will depend on the configuration of the particular system and apparatus (e.g. vehicle).

For example, where only a relatively brief error is detected (which subsequently ceases), a log of the error may be stored, e.g. for investigation later by a service engineer.

Where a prolonged error is detected, the Automotive Mirror Replacement system may be disabled and the operator may be notified (e.g. an error message may be displayed to the operator, or some other audible, physical, etc. notification may be provided to the operator). In this case, another system such as a radar/blind spot detection system may be used instead.

In the present embodiment, every image in a sequence of images produced by the source 10 is watermarked using a unique or quasi-unique watermark. It would be possible, however, for less than all of the images in a sequence of images to be watermarked (e.g. periodically).

Although the above embodiments have been described in terms of an Automotive Mirror Replacement system, the techniques of various embodiments can be used in other contexts.

For example, the technique can be used in medical devices such as endoscopes. In this case, a fish-eye type lens might introduce barrel distortions which may be corrected by an image processor.

The technique can also be used in other arrangements in which the output images are not necessarily displayed. For example, the output images may be for use by a machine learning system, e.g. configured to perform image recognition, and the like. Such embodiments may use the arrangement of FIG. 5, where watermarks are removed, e.g. to avoid inadvertent supplying "adversarial" images to the machine learning system (or otherwise).

More generally, the technique can be beneficially used in any suitable arrangement where an error in image processing might be problematic or dangerous.

It can be seen from the above that the technology described herein, in its embodiments at least, provides a relatively straightforward and robust technique for verifying image processing operations performed by one or more image processors. This is achieved, in embodiments of the technology described herein at least, by inserting one or more probes into one or more images prior to the one or more images being processed by the one or more image processing stages of the set of one or more image processing stages, and then attempting to identify one or more probes in an output of the one or more processing stages.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. An image processing system, comprising:
one or more image sensors configured to take images;
one or more image processors configured to process images taken by the one or more image sensors so as to produce output images, wherein the one or more image processors comprise a set of one or more image processing stages, each stage being configured to process images using a respective image processing operation;
one or more circuits configured to use output images produced by the one or more image processors; and
processing circuitry configured to verify image processing performed by one or more image processing stages of the set of one or more image processing stages, by:
inserting one or more probes into one or more images prior to the one or more images being processed by the one or more image processing stages of the set of one or more image processing stages; and
attempting to identify one or more probes in an output of the one or more processing stages.

2. The system of claim 1, wherein the processing circuitry is configured to insert the one or more probes into the one or more images such that the one or more probes are processed by the one or more image processing stages of the set of one or more image processing stages together with the one or more images.

3. The system of claim 1, wherein the processing circuitry is configured to insert the one or more probes into the one or more images by modifying the one or more images.

4. The system of claim 1, wherein:
the one or more images comprises a sequence of images; and
the processing circuitry is configured to insert the one or more probes into the one or more images by inserting one or more test images into the sequence of images.

5. The system of claim 1, wherein the image processing system is configured to remove or discard one or more probes prior to using the output images.

6. The system of claim 1, wherein the one or more probes comprises a set of plural probes, and wherein the processing circuitry is configured to insert the set of plural probes into an image such that each probe is evenly distributed throughout the image.

7. The system of claim 1, wherein the image processing system is configured to change the configuration of the one or more probes with time.

8. The system of claim 1, wherein the processing circuitry is configured to attempt to identify one or more expected probes in the output, where each expected probe is a probe that, based on the image processing operations of the one or more image processing stages, is expected to appear in the output.

9. The system of claim 1, wherein the image processing system is configured to determine that the one or more image processing stages have not accurately performed image processing when:
one or more expected probes cannot be identified in the output;
one or more expected probes is identified in an unexpected temporal and/or spatial position within the output; and/or
one or more unexpected probes are identified in the output.

10. The system of claim 1, wherein the image processing system is configured to determine that the one or more image processing stages have accurately performed image processing when:
one or more expected probes can be identified in the output;
one or more expected probes can be identified at an expected temporal and/or spatial position in the output; and/or
one or more unexpected probes cannot be identified in the output.

11. The system of claim 1, wherein the set of one or more image processing stages comprises one or more of: a scaler, a cropping stage, a flip stage, one or more image enhancement stages, a compositor, a filter, and a rotation stage.

12. An image processor comprising:
image processing circuitry configured to process images so as to produce output images, wherein the image processing circuitry comprise a set of one or more image processing stages, each stage being configured to process images using a respective image processing operation; and processing circuitry configured to verify image processing performed by one or more image processing stages of the set of one or more image processing stages, by:
- inserting one or more probes into one or more images prior to the one or more images being processed by the one or more processing stages of the set of one or more image processing stages; and
- attempting to identify one or more probes in an output of the one or more processing stages.

13. A method of operating an image processor, the method comprising:
- processing images using a set of one or more image processing stages so as to produce output images; and
- verifying image processing performed by one or more image processing stages of the set of one or more image processing stages, by:
  - inserting one or more probes into one or more images prior to the one or more images being processed by the one or more processing stages of the set of one or more image processing stages; and
  - attempting to identify one or more probes in an output of the one or more processing stages.

14. The method of claim 13, further comprising using and/or displaying the one or more output images.

15. The method of claim 13, comprising:
- inserting the one or more probes into the one or more images; and
- the one or more image processing stages of the set of one or more image processing stages: processing the one or more probes together with the one or more images.

16. The method of claim 13, comprising inserting the one or more probes into the one or more images by modifying the one or more images.

17. The method of claim 13, wherein the one or more images comprises a sequence of images, and the method comprises:
- inserting the one or more probes into the one or more images by inserting one or more test images into the sequence of images.

18. The method of claim 13, further comprising changing the configuration of the one or more probes with time.

19. The method of claim 13, comprising attempting to identify one or more expected probes in the output, where each expected probe is a probe that, based on the image processing operations of the one or more image processing stages, is expected to appear in the output.

20. The method of claim 13, further comprising determining that the one or more image processing stages have not accurately performed image processing when:
- one or more expected probes cannot be identified in the output;
- one or more expected probes is identified in an unexpected temporal and/or spatial position within the output; and/or
- one or more unexpected probes are identified in the output.

21. The method of claim 13, further comprising determining that the one or more image processing stages have accurately performed image processing when:
- one or more expected probes can be identified in the output;
- one or more expected probes can be identified at an expected temporal and/or spatial position in the output; and/or
- one or more unexpected probes cannot be identified in the output.

22. A non-transitory computer readable storage medium storing computer software code which when executing on a processor performs a method of operating an image processor, the method comprising:
- processing images using a set of one or more image processing stages so as to produce output images; and
- verifying image processing performed by one or more image processing stages of the set of one or more image processing stages, by:
  - inserting one or more probes into one or more images prior to the one or more images being processed by the one or more processing stages of the set of one or more image processing stages; and
  - attempting to identify one or more probes in an output of the one or more processing stages.

* * * * *